United States Patent
Chang et al.

(10) Patent No.: US 10,082,948 B2
(45) Date of Patent: Sep. 25, 2018

(54) APPARATUS AND METHOD FOR GROUPING AND DISPLAYING ICONS ON A SCREEN

(75) Inventors: Youn Seog Chang, Hwaseong-si (KR); Joon Woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 12/905,408

(22) Filed: Oct. 15, 2010

(65) Prior Publication Data

US 2011/0093816 A1    Apr. 21, 2011

(30) Foreign Application Priority Data

Oct. 16, 2009 (KR) .......................... 10-2009-0098944

(51) Int. Cl.
*G06F 3/0488* (2013.01)

(52) U.S. Cl.
CPC .................................. *G06F 3/0488* (2013.01)

(58) Field of Classification Search
CPC .... G06F 3/0481; G06F 3/0484; G06F 3/0488; G06F 3/0482
USPC ........................................ 715/837, 765, 766
See application file for complete search history.

(56) References Cited

U.S. PATENT DOCUMENTS

| | | | |
|---|---|---|---|
| 5,060,135 A * | 10/1991 | Levine et al. | 715/769 |
| 5,801,699 A * | 9/1998 | Hocker et al. | 715/837 |
| 5,841,435 A * | 11/1998 | Dauerer et al. | 715/775 |
| 6,469,722 B1 * | 10/2002 | Kinoe et al. | 715/837 |
| 6,611,291 B1 * | 8/2003 | Dow | H04N 1/00384 348/239 |
| 6,857,106 B1 * | 2/2005 | Brouaux | 715/837 |
| 7,315,985 B1 * | 1/2008 | Gauvin | H04L 41/12 715/734 |
| 7,523,405 B2 * | 4/2009 | Robertson et al. | 715/766 |
| 7,526,738 B2 * | 4/2009 | Ording et al. | 715/862 |
| 8,205,172 B2 * | 6/2012 | Wong | G06F 17/30884 715/704 |
| 8,381,129 B2 * | 2/2013 | Ohazama et al. | 715/815 |
| 8,392,849 B2 * | 3/2013 | Jung | 715/837 |
| 8,656,314 B2 * | 2/2014 | Locker et al. | 715/863 |
| 2005/0192924 A1 * | 9/2005 | Drucker et al. | 707/1 |
| 2005/0270307 A1 * | 12/2005 | Jacques Brouaux | 345/619 |

(Continued)

FOREIGN PATENT DOCUMENTS

| | | |
|---|---|---|
| JP | 2007-328456 A | 12/2007 |
| KR | 10-2006-0076710 A | 7/2006 |

(Continued)

OTHER PUBLICATIONS

IBM Technical Disclosure Bulletin, "Adding and Removing Icons from a Multi-Icon", Mar. 1, 1993, TDB-ACC-No. N9303401, pp. 401-402.*

(Continued)

*Primary Examiner* — Steven Sax
(74) *Attorney, Agent, or Firm* — Jefferson IP Law, LLP

(57) ABSTRACT

A shortcut icon display method and a mobile device adapted to the method are provided. The method includes displaying, if a group icon including at least two icons is selected, at least two icons included in the group icon, and performing a function corresponding to a selected one of at least two displayed icons.

25 Claims, 8 Drawing Sheets

(56) References Cited

U.S. PATENT DOCUMENTS

| | | | |
|---|---|---|---|
| 2006/0090141 A1* | 4/2006 | Loui | G06F 17/30064 715/764 |
| 2006/0143574 A1 | 6/2006 | Ito et al. | |
| 2007/0033537 A1* | 2/2007 | Mander et al. | 715/764 |
| 2007/0065044 A1* | 3/2007 | Park et al. | 382/305 |
| 2007/0288868 A1* | 12/2007 | Rhee et al. | 715/840 |
| 2008/0040682 A1* | 2/2008 | Sorenson | G06F 3/04817 715/777 |
| 2008/0141166 A1* | 6/2008 | Goldberg et al. | 715/788 |
| 2008/0307359 A1 | 12/2008 | Louch et al. | |
| 2009/0019385 A1* | 1/2009 | Khatib et al. | 715/765 |
| 2009/0031253 A1* | 1/2009 | Lee | G06F 3/04817 715/835 |
| 2009/0094553 A1* | 4/2009 | Karstens | G06F 3/04817 715/810 |
| 2009/0094554 A1* | 4/2009 | Karstens | G06F 3/04817 715/810 |
| 2009/0178008 A1* | 7/2009 | Herz et al. | 715/840 |
| 2009/0193363 A1* | 7/2009 | Atherton | 715/835 |
| 2010/0058182 A1* | 3/2010 | Jung | G06F 3/04883 715/702 |
| 2010/0095248 A1* | 4/2010 | Karstens | 715/846 |
| 2010/0127997 A1* | 5/2010 | Park et al. | 345/173 |
| 2010/0138763 A1* | 6/2010 | Kim | 715/765 |
| 2010/0164877 A1* | 7/2010 | Yu et al. | 345/173 |

FOREIGN PATENT DOCUMENTS

| | | | | |
|---|---|---|---|---|
| KR | 2010062252 A | * | 6/2010 | |
| KR | 2011005555 A | * | 1/2011 | G06F 3/048 |
| WO | WO 2008012965 A1 | * | 1/2008 | G06F 3/048 |

OTHER PUBLICATIONS

Anonymous, Icon grouping allowing common and individual icon interaction joining ICONS on screen, dragging objects targetted to specific ICON or collection, sizing ICONS and customising gps, Jul. 10, 1990, RD 315042 A, 1 pg.*

Apple Corp., iPhone User Guide (For iOS 3.1 Software), Sep. 9, 2009, retrieved from the internet on Feb. 15, 2013 at http://support.apple.com/manuals/#iphone pp. 20-26, 85, 111, 165-166.*

"Graphical user interface" and "icon" definitions. IEEE Std 100, The Authoritative Dictionary of IEEE Standards Terms, 7th edition, copyright 2000 by The Institute of Electrical and Electronics Engineers. ISBN 0-7381-2601-2. pp. 487, 528.*

Wikipedia, "Processor," [online], Nov. 11, 2008, URL:https://en.wikipedia.org/w/index.php?title=Processor&oldid=257253825, retrieved on Mar. 23, 2017.

* cited by examiner

APPARATUS AND METHOD FOR GROUPING AND DISPLAYING ICONS ON A SCREEN

PRIORITY

This application claims the benefit under 35 U.S.C. § 119(a) of a Korean patent application filed on Oct. 16, 2009 in the Korean Intellectual Property Office and assigned Serial No. 10-2009-0098944, the entire disclosure of which is hereby incorporated by reference.

BACKGROUND OF THE INVENTION

1. Field of the Invention

The present invention relates to electronic systems. More particularly, the present inventions relates to a data display method for displaying icons in order to select a corresponding function, and a mobile device adapted to the method.

2. Description of the Related Art

A touch screen is a type of display that includes a display unit and an input unit. Recently, touch screens have become popular user interfaces for many electronic systems. Touch screens are especially conducive to small electronic devices, e.g., mobile devices.

Mobile devices with a touch screen have become popular because they provide a variety of functions. Such mobile devices may display shortcut icons for frequently used functions in the background image of the touch screen, so that a user can easily select and execute a corresponding function. The conventional method for displaying shortcut icons is explained with reference to FIG. 1.

FIG. 1 illustrates a screen of a mobile device, displaying shortcut icons according to the conventional art.

The mobile device 100 may display a number of shortcut icons on the screen 115, according to a user's selection. For example, as shown in FIG. 1, the mobile device 100 may display several shortcut icons on the screen 115, for example, a shortcut icon 121 for altering background images, a shortcut icon 122 for identifying subway lines, a timer shortcut icon 123, a schedule shortcut icon 124, a shortcut icon 125 for executing a mirror function, a diary shortcut icon 126, and a volume control icon 127.

However, because the size of the screen is limited, and may optionally be configured to be a touch screen, the touch screen can only display a limited number of shortcut icons. In addition, if several shortcut icons are displayed on the screen, they may be superimposed over one another. In that case, the user may be unable to designate a shortcut icon that he/she intended to select.

SUMMARY OF THE INVENTION

An aspect of the present invention is to address at least the above-mentioned problems and/or disadvantages and to provide at least the advantages described below. Accordingly, an aspect of the present invention is to provide a data display method for displaying icons in order to select a corresponding function.

Another aspect of the present invention is to provide a mobile device adapted to the data display method.

In accordance with an aspect of the present invention, a data display method for displaying at least one icon in a mobile device, in order to select a particular function, is provided. The method including: displaying, if a group icon including at least two icons is selected, at least two icons included in the group icon; and performing a function corresponding to a selected one of at least two displayed icons.

In accordance with another aspect of the present invention, a mobile device is provided. The mobile device includes a display unit for displaying at least one group icon each of which includes at least two icons, and a controller for controlling the display unit to display, if a group icon including at least two icons is selected, at least two icons included in the group icon, and to perform a function corresponding to a selected one of at least two displayed icons.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
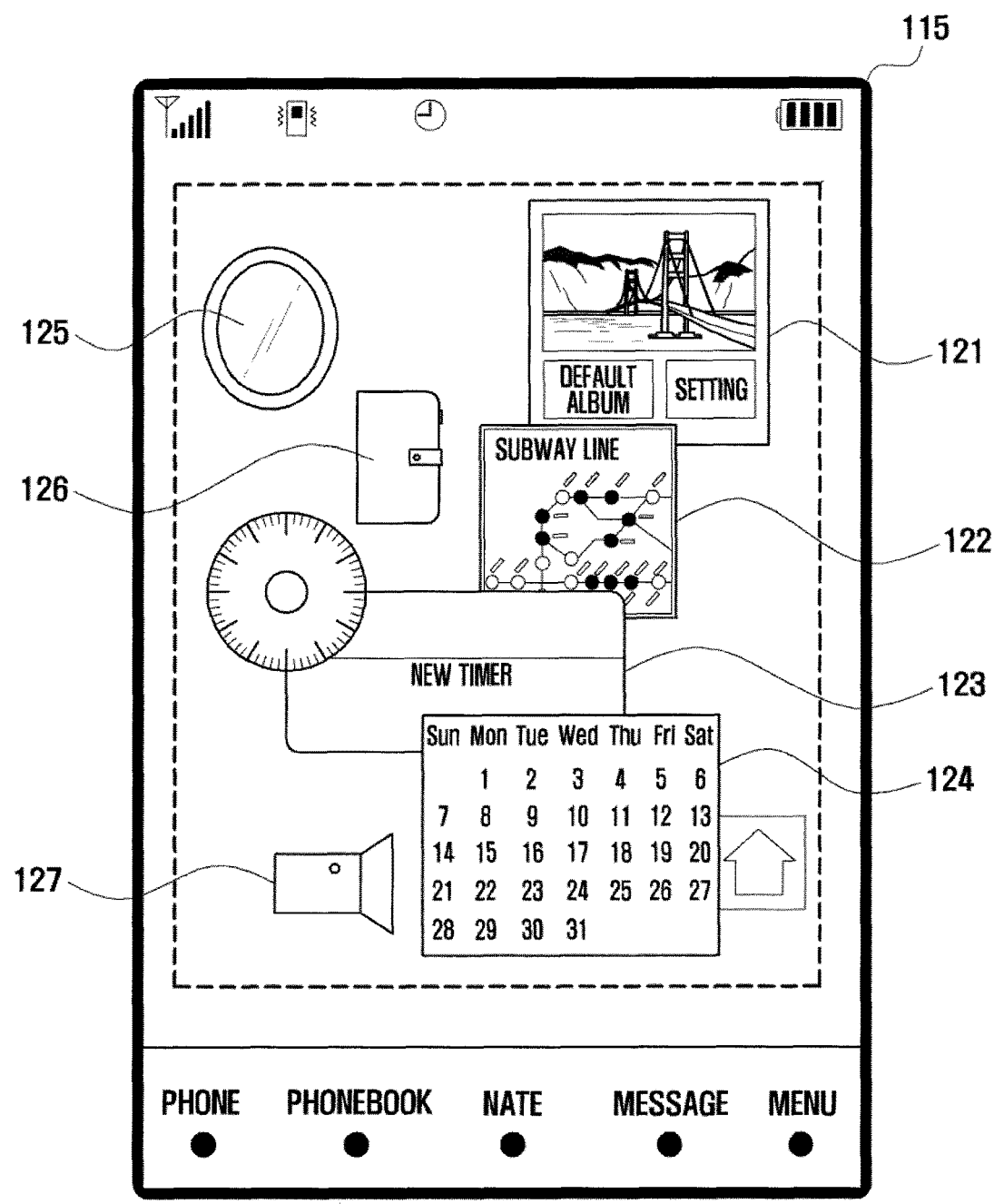
FIG. 1 illustrates a screen of a mobile device, displaying shortcut icons according to a conventional art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Prior to explaining exemplary embodiments of the present invention, terminologies will be defined for the description below. The terms or words described in the present description and the claims should not be limited by a general or lexical meaning, but instead should be understood as meanings and concepts through which the inventor describes the present invention. Therefore, one skilled in the art will understand that the exemplary embodiments disclosed in the description and configurations illustrated in the drawings are only exemplary, and there may be various modifications, alterations, and equivalents thereof to replace the exemplary embodiments at the time of filing this application without departing from the spirit or scope of the present invention.

In the following description, the term 'mobile device' refers to an information processing system that can display, store, create, and delete data. The term 'mobile device' can be applied to computers, laptop computers, mobile communication devices, etc. The mobile device is equipped with a touch screen and displays a number of shortcut icons in the background image on the touch screen.

The term 'shortcut icon' refers to a selectable icon that is associated with a particular function and displayed as an image, a letter, etc. If a user selects a shortcut icon on the touch screen, the mobile device detects a function associated with the selected shortcut icon and performs the detected function.

The 'background screen' refers to an idle screen displayed on the touch screen when the mobile device is in an idle state. In an exemplary embodiment of the present invention, the background screen is an idle screen on which at least a shortcut icon for performing a particular function is displayed according to the user's selection.

Figure 2:
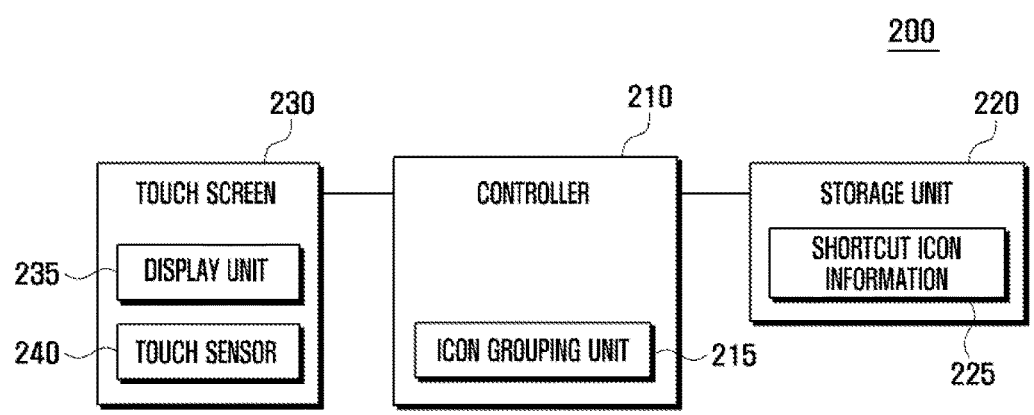
FIG. 2 illustrates a schematic block diagram of a mobile device according to an exemplary embodiment of the present invention.

FIG. 2 illustrates a schematic block diagram of a mobile device according to an exemplary embodiment of the present invention.

Referring to FIG. 2, the mobile device 200 includes a controller 210, a storage unit 220, and a touch screen 230.

The controller 210 controls the entire operation and state of the components in the mobile device 200. In an exemplary embodiment of the present invention, the controller 210 groups shortcut icons or ungroups the grouped shortcut icons on a background screen, according to a user's selection. To this end, the controller 210 includes an icon grouping unit 215.

The icon grouping unit 215 groups shortcut icons in one or more groups or ungroups the group icons on the background screen, according to a user's selection. For example, the icon grouping unit 215 groups at least two shortcut icons, selected by the user, in a group. There are two methods for grouping at least two shortcut icons in a group. In the first method, at least two shortcut icons are grouped in a particular region, which is set as a group icon display region, on a display unit 235 of the touch screen 230. In the second method, a first shortcut icon is moved into a region on which a second shortcut icon has been displayed, so that they are grouped.

The first method for grouping at least two shortcut icons, located in the group icon display region, is explained below.

The icon grouping unit 215 determines whether a shortcut icon grouping function is executed via a menu or shortcut key. If a shortcut icon grouping function has been executed via a menu or shortcut key, the icon grouping unit 215 determines whether the user selects the group icon display region on the display unit 235. The group icon display region refers to a region for displaying shortcut icons grouped according to a user's selection. When the user has selected the group icon display region, the icon grouping unit 215 determines whether at least one shortcut icon is moved to the group icon display region.

If the icon grouping unit 215 ascertains that at least one shortcut icon is moved to the group icon display region, it detects the shortcut icons moved to the group icon display region. After that, the icon grouping unit 215 groups at least one shortcut icon, located in the group icon display region. The icon grouping unit 215 detects functions performed by the grouped shortcut icons, respectively, and location information about the regions on which the grouped shortcut icons are displayed.

The second method for grouping at least two shortcut icons if they are located at the same region is explained below.

The icon grouping unit 215 determines whether a shortcut icon grouping function is executed via a menu or a shortcut key. If a shortcut icon grouping function has been executed, the icon grouping unit 215 determines whether a first one of the shortcut icons displayed on the display unit 235 is moving. If the icon grouping unit 215 detects the movement of the first shortcut icon, it determines whether the first shortcut icon is moved to a region where a second shortcut icon has been displayed.

If the first shortcut icon is moved to and located in the region where a second shortcut icon has been displayed, the icon grouping unit 215 groups the first and second shortcut icons. The icon grouping unit 215 detects functions, performed by the grouped shortcut icons, and location information about the grouped shortcut icons.

Although the exemplary embodiment has been explained in such a way that the icon grouping unit 215 groups the shortcut icons located in a particular region on the display unit 235, it should be understood that the present invention is not limited to the exemplary embodiment. For example, if the user selects a number of shortcut icons to be grouped and then operates a menu or function key, the icon grouping unit 215 can group the selected shortcut icons. Alternatively, if the user selects a menu for grouping shortcut icons, such as a group icon setting menu, and then a number of shortcut icons displayed on the display unit 235, the icon grouping unit 215 can group the selected shortcut icons.

On the other hand, if the user executes an icon ungrouping function, the icon grouping unit 215 ungroups the grouped shortcut icons. The icon ungrouping function is executed by a menu or a function key. If the mobile device 200 is equipped with a motion sensor, such as a geomagnetic sensor, the icon grouping unit 215 can perform an icon ungrouping function according to a predetermined motion of the mobile device 200. For example, a shaking motion of the mobile device 200 may be set to execute the icon ungrouping function. In that case, if the user selects a group icon and then shakes the mobile device 200, the icon grouping unit 215 can ungroup it.

The controller 210 controls the storage unit 220 to store information about the functions that are performed, respectively, by the shortcut icons grouped in a group icon, and a region on which the group icon is displayed. The controller 210 controls the display unit 235 to display at least one group icon that groups shortcut icons via the icon grouping unit 215. The group icon shows shortcut icons, contained therein, in reduced size. If the group icon is ungrouped, the controller 210 controls the display unit 235 to display the shortcut icons, grouped in the group icon, on their locations before they are grouped.

The controller 210 can magnify and display a shortcut icon, grouped in the group icon, according to a user selection. In an exemplary embodiment of the present invention, it is assumed that the first and second shortcut icons are grouped in a group icon on the touch screen 230 of the mobile device 200. If the first touch event occurs on a region on which the group icon is displayed on the touch screen 230, the controller 210 magnifies and displays the first shortcut icon greater than the second icon. Alternatively, if the second touch event occurs, the controller 210 magnifies and displays the second shortcut icon greater than the first icon. In addition, if a touch event occurs, twice, successively, on the region where the magnified shortcut icon is displayed on the touch screen 230, the controller 210 performs a function corresponding to the magnified shortcut icon.

The storage unit 220 stores applications required to perform functions of the mobile device 200 and data created when the applications are executed. The storage unit 220 also stores shortcut icon information 225 that includes functions mapped to shortcut icons, images for displaying the shortcut icons, and information about locations where the shortcut icons are displayed. If at least two shortcut icons are grouped to create a group icon, the storage unit 220 stores location information about the group icon and information about functions of the shortcut icons grouped in the group icon, under the control of the controller 210.

The touch screen 230 includes a display unit 235 and a touch sensor 240.

The display unit 235 displays information, related to the entire state and operation of the mobile device 200, under the control of the controller 210. The display unit 235 also displays group icons under the control of the controller 210. The method for displaying group icons will be explained, in detail, later, with reference to FIGS. 3 and 4.

The touch sensor 240 is installed to the display unit 235 and detects a touch event created when an object, e.g., a user's finger or a stylus, touches or releases the touch screen 230. The touch sensor 240 transfers a coordinate corresponding to a region where a touch event has occurred to the controller 210. The controller 210 can detect information about a region where a group icon will be displayed and information about a region to which a shortcut icon is moved, using the received coordinate.

The mobile device 200, configured as described above, can group at least two shortcut icons in a group and displays the group icon. If the mobile device 200 detects a touch to the group icon, it magnifies and displays the shortcut icons in the group icon, in order. This process allows the mobile device user to easily detect the shortcut icons in the group icon. The process also allows the mobile device 200 to display a number of shortcut icons.

Figure 3:
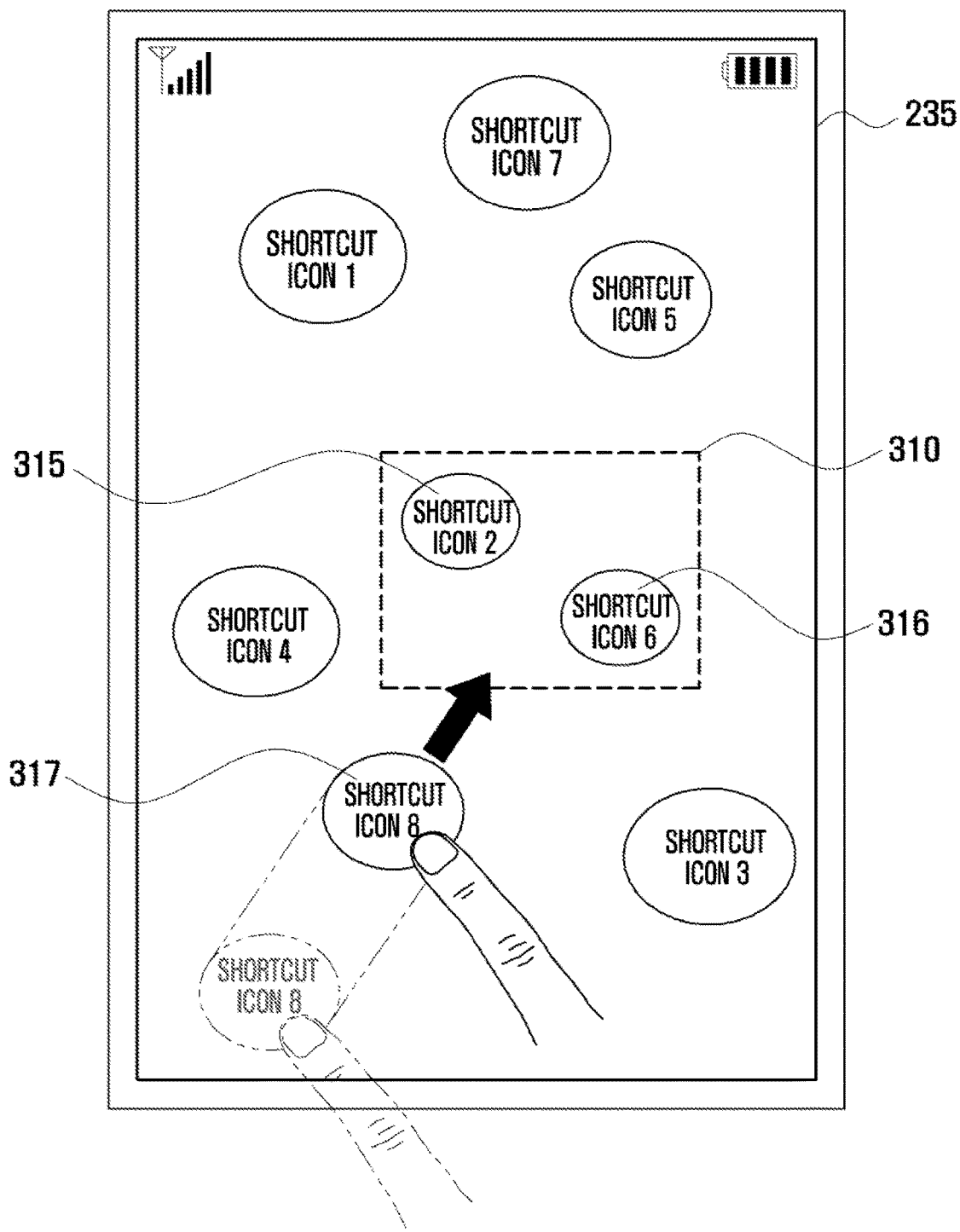
FIG. 3 illustrates an exemplary screen of a mobile device, displaying shortcut icons, according to an exemplary embodiment of the present invention.

FIG. 3 illustrates an exemplary screen of a mobile device, displaying shortcut icons, according to an exemplary embodiment of the present invention.

The display unit 235 displays eight shortcut icons, Shortcut icons 1 to 8, on the background screen, under the control of the controller 210. If a shortcut icon grouping function is selected, the controller 210 groups at least two shortcut icons in a group icon display region 310, for example, Shortcut icon 2 (315) and Shortcut icon 6 (316), on the display unit 235. If the user moves Shortcut icon 8 (317) to the group icon display region 310, the controller 210 controls the display unit 235 to display a group icon, grouping Shortcut icon 2 (315), Shortcut icon 6 (316), and Shortcut icon 8 (317), in the group icon display region 310.

Figure 4:
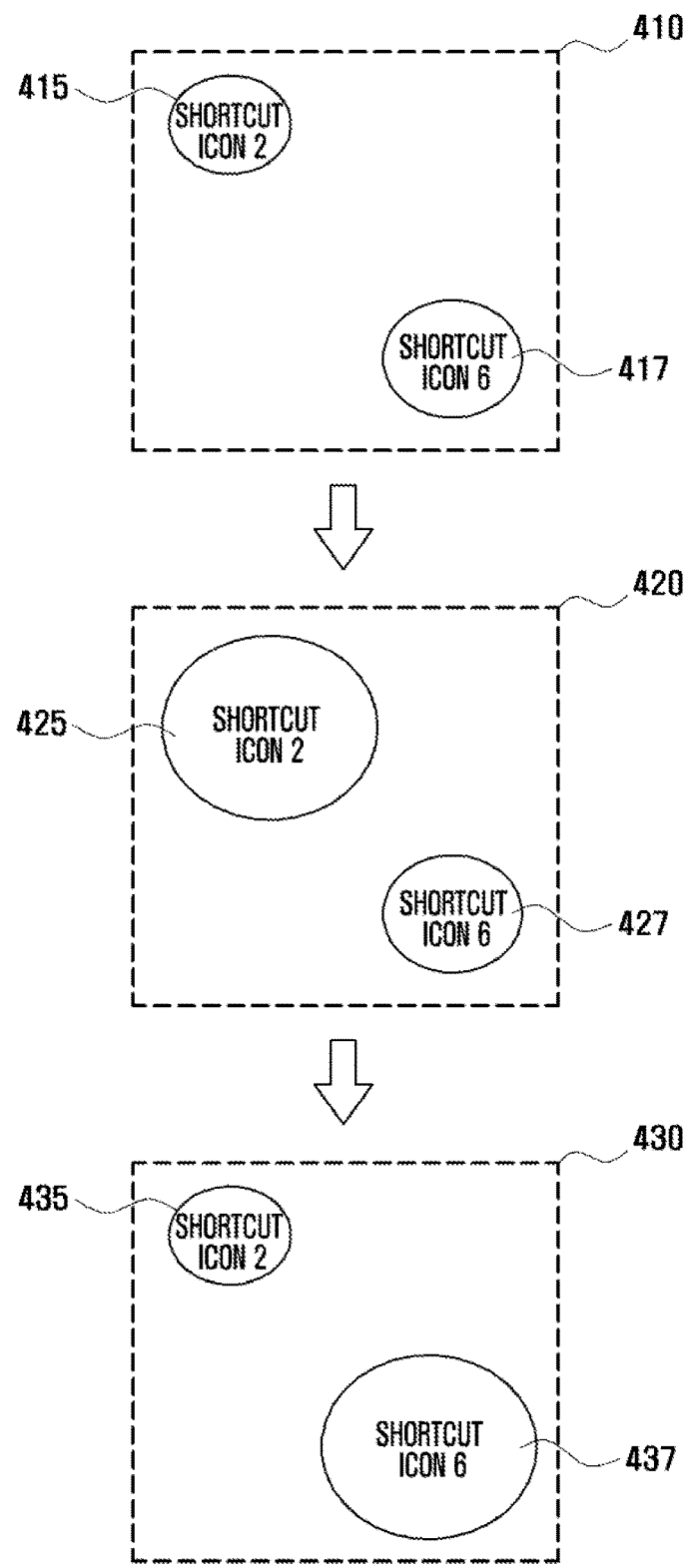
FIG. 4 illustrates exemplary screens of a mobile device that describes a process of selecting a shortcut icon, according to an exemplary embodiment of the present invention.

FIG. 4 illustrates exemplary screens of a mobile device that describe a process of selecting a shortcut icon, according to an exemplary embodiment of the present invention.

Referring to FIG. 4, diagram 410 shows a group icon where Shortcut icon 2 (415) and Shortcut icon 6 (417) are grouped. Grouped Shortcut icon 2 (415) and Shortcut icon 6 (417) are reduced at the same rate and displayed relatively small.

Diagram 420 shows a group icon where Shortcut icon 2 (425) is magnified and displayed greater than Shortcut icon 6 (427). If the user selects the group icon once to identify the grouped shortcut icons, the display unit 235 magnifies and displays Shortcut icon 2 (245) greater than Shortcut icon 6 (427), under the control of the controller 210.

Diagram 430 shows a group icon where Shortcut icon 6 (437) is magnified and displayed greater than Shortcut icon 2 (435). If the user selects the group icon twice to identify the grouped shortcut icons, the display unit 235 magnifies and displays Shortcut icon 6 (437) greater than Shortcut icon 2 (435), under the control of the controller 210.

The order of magnifying the shortcut icons can be set, for example, according to the order of selecting the shortcut icons when the group icon is set, the frequency order of using the functions of the shortcut icons, or the order of locations where the shortcut icons are displayed in the group icon.

Figure 5:
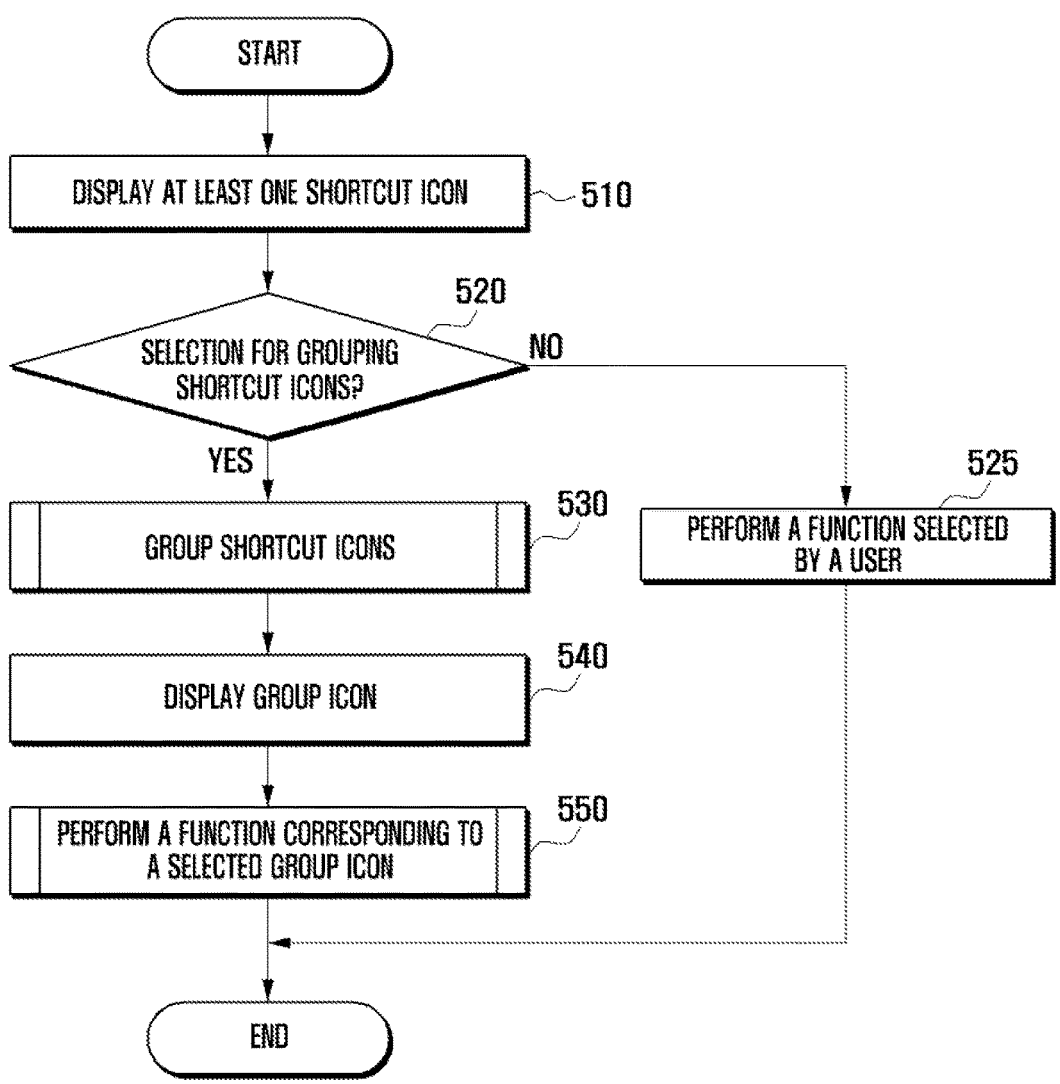
FIG. 5 shows a flowchart that describes a method for displaying a shortcut icon, according to an exemplary embodiment of the present invention.

FIG. 5 shows a flowchart that describes a method for displaying a shortcut icon, according to an exemplary embodiment of the present invention.

Referring to FIG. 5, the controller 210 controls the display unit 235 to display at least one shortcut icon on the background screen at step 510. The controller 210 determines whether a shortcut icon grouping function is selected at step 520. If the controller 210 ascertains that a shortcut icon grouping function has not been selected at step 520, it performs a function corresponding to a user's selection at step 525.

On the contrary, if the controller 210 ascertains that a shortcut icon grouping function has been selected at step 520, it groups at least two shortcut icons at step 530. The shortcut icon grouping function can be selected via a menu, or alternatively, via a function key. The shortcut icon grouping process will be explained in detail with reference to FIGS. 6 and 7.

After that, the controller 210 displays the group icon of the grouped shortcut icons on the display unit 235 at step 540. The controller 210 performs a function according to a selected group icon at step 550, which will be explained in detail with reference to FIG. 8.

In the following description, the shortcut icon grouping process, step 530, is explained with reference to FIGS. 6 and 7.

Figure 6:
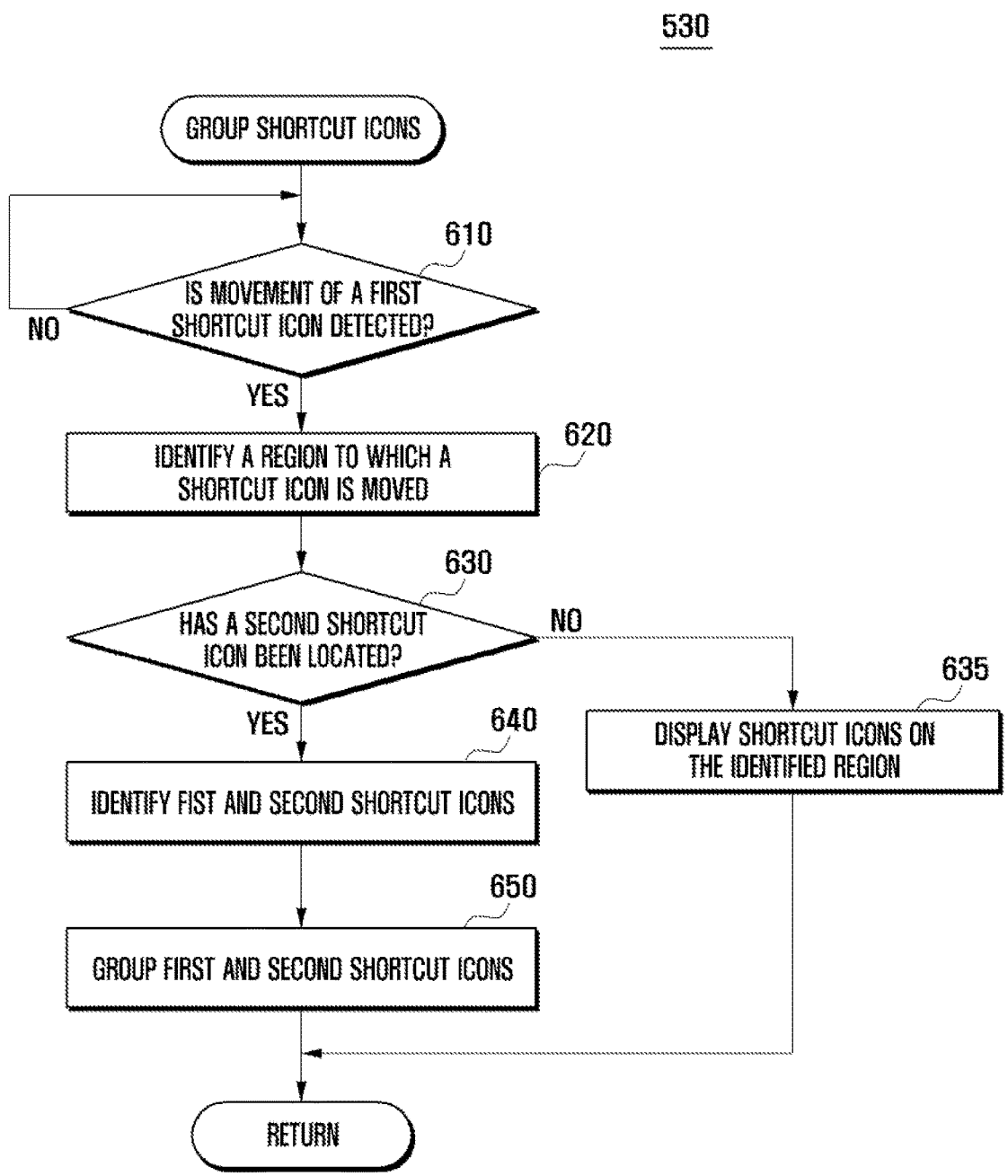
FIG. 6 shows a flowchart that describes a first a method for grouping shortcut icons according to an exemplary embodiment of the present invention.

FIG. 6 shows a flowchart that describes a first method for grouping shortcut icons according to an exemplary embodiment of the present invention.

Referring to FIG. 6, if a shortcut icon grouping function has been selected at step 520, the controller 210 detects the movement of a first shortcut icon of the shortcut icons displayed on the display unit 235 at step 610. After that, the controller 210 detects a region to which the first shortcut icon is moved at step 620. If the mobile device 200 is equipped with a touch screen 230, the controller 210 can identify the region to which the first shortcut icon is moved, via a touch event detected by the touch screen 230. Alternatively, if the mobile device 200 is equipped with a key input mechanism, the controller 210 detects a user's selected shortcut icon and identifies the region to which the first shortcut icon is moved according to the user's input directional keys.

After that, the controller 210 determines whether a second shortcut icon is located in the region to which the first shortcut icon is moved at step 630. If a second shortcut icon is not located in the region to which the first shortcut icon is moved at step 630, the controller 210 displays the shortcut icon in the identified region at step 635. The controller 210 updates location information about a corresponding shortcut icon, in the shortcut icon information stored in the storage unit 220, with the location information about the identified region.

On the contrary, if a second shortcut icon is located in the region to which the first shortcut icon is moved at step 630, the controller 210 identifies information about the first and second shortcut icons at step 640. The controller 210 groups the first and second shortcut icons at step 650. The controller 210 shows a pop-up message stating whether the first and second shortcut icons are grouped on the display unit 235. If at least two shortcut icons are located in a certain region on the display unit 235, the controller 210 can automatically group them. Alternatively, if the user inputs a particular key, the controller 210 can also group at least two shortcut icons.

The group icon grouping method had been explained where a first shortcut icon of the shortcut icons displayed on the background screen is moved to and superimposed with a second and thus they are grouped. In the following description, a group icon grouping method is explained where at least two shortcut icons are moved to a particular region and thus they are grouped, with reference to FIG. 7.

Figure 7:
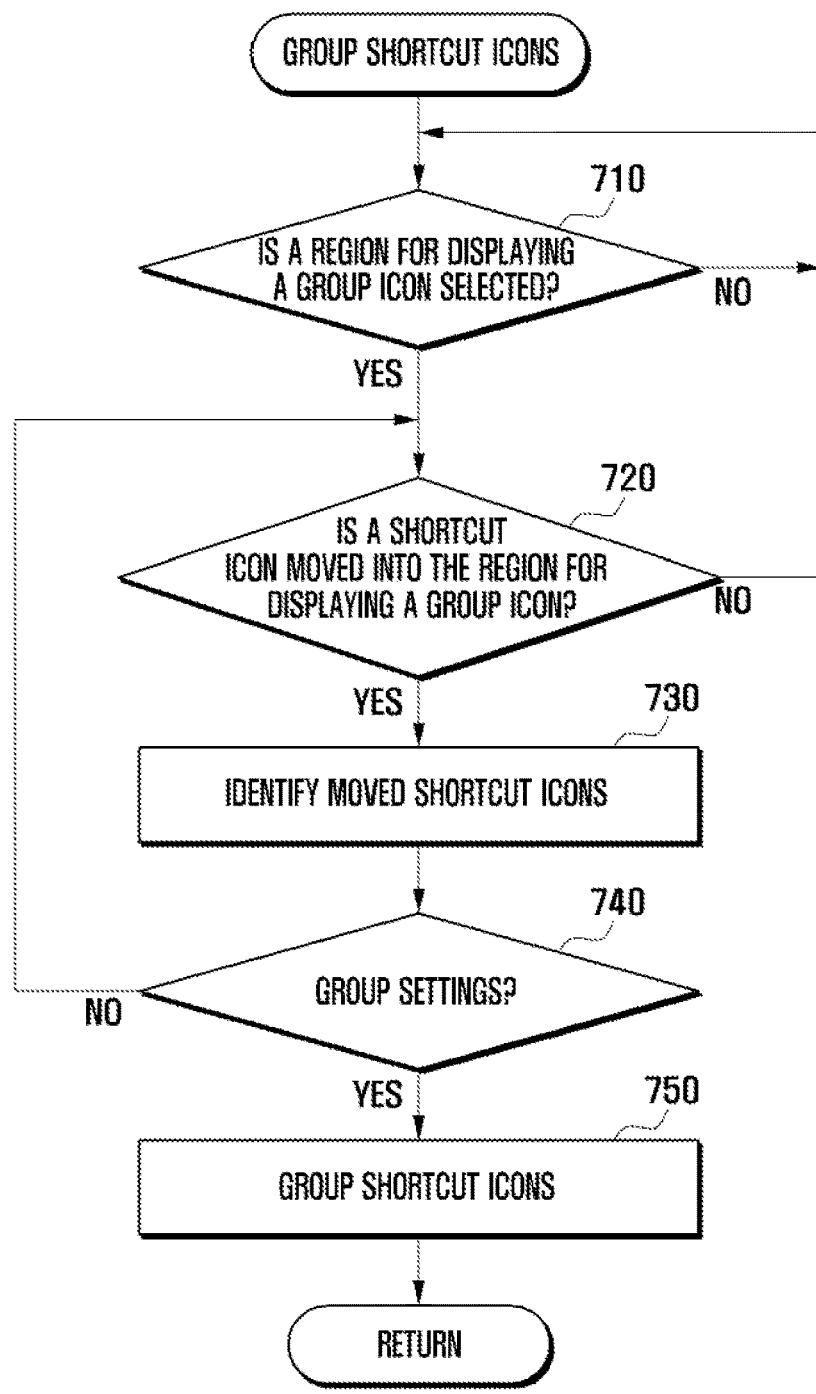
FIG. 7 shows a flowchart that describes a second method for grouping shortcut icons according to an exemplary embodiment of the present invention.

FIG. 7 shows a flowchart that describes a second method for grouping shortcut icons according to an exemplary embodiment of the present invention.

Referring to FIG. 7, if a shortcut icon grouping function has been selected at step 520, the controller 210 determines whether a group icon display region in which a group icon will be displayed is selected at step 710. If a group icon display region in which a group icon will be displayed has been selected at step 710, the controller 210 determines whether one of at least one shortcut icon, displayed on the background screen, is moved to the group icon display region at step 720.

If one of at least one shortcut icon, displayed on the background screen, is moved to the group icon display region at step 720, the controller 210 identifies the shortcut icon moved to the group icon display region at step 730. That is, the controller 210 identifies a function, performed according to a corresponding shortcut icon, and images used to display the shortcut icons. After that, the controller 210 determines whether a group icon setting is selected at step 740. If the controller 210 ascertains that a group icon setting has not been selected at step 740, it returns to and proceeds with step 720. If these processes are repeated, a number of shortcut icons can be moved to one group icon display region.

In contrast, if the controller 210 ascertains that a group icon setting has been selected at step 740, it groups the identified shortcut icons at step 750. The controller 210 can show a pop-up message allowing the user to optionally select a grouping function on the display unit 235. In that case, the user can identify the shortcut icons to be grouped and then select a grouping function. Alternatively, if at least two shortcut icons are located in the group icon display region, the controller 210 can automatically group them. In addition, if the user inputs a particular key, the controller 210 can also group at least two shortcut icons.

As described in FIGS. 6 and 7, the icon grouping method can group at least one shortcut icon if at least one shortcut icon is located in a particular region or in the same region with other shortcut icons. It should be understood that the present invention is not limited to the exemplary embodiment. For example, the exemplary embodiment can be modified in such a way that, if at least two shortcut icons are simultaneously selected, they can also be grouped. Through these methods, grouped shortcut icons can be displayed in a particular region on the display unit 235.

In the following description, the process of performing a function according to a selected group icon, step 550, is explained with reference to FIG. 8.

Figure 8:
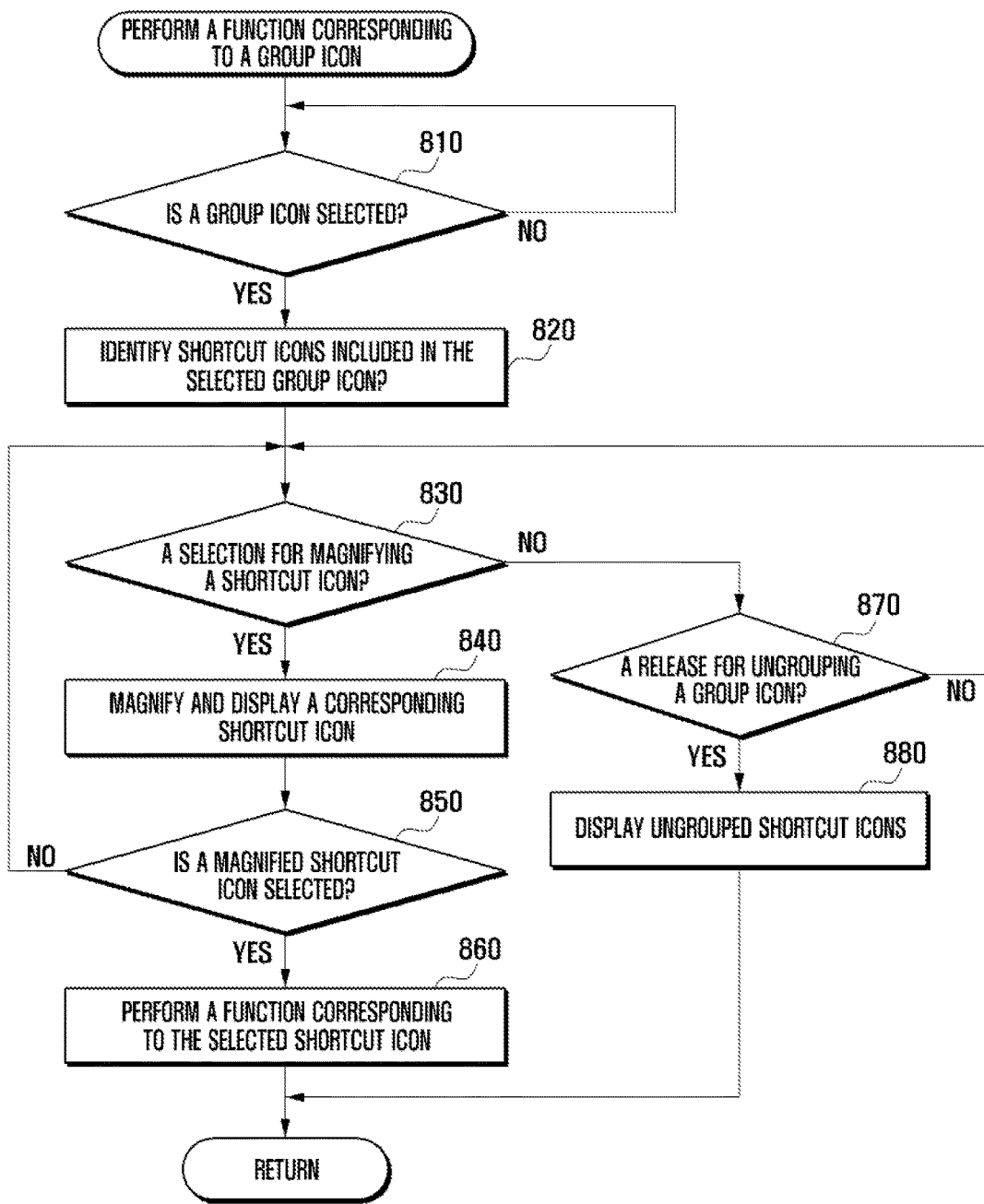
FIG. 8 shows a flowchart that describes a method for performing a function according to a group icon, according to an exemplary embodiment of the present invention.

FIG. 8 shows a flowchart that describes a method for performing a function according to a group icon, according to an exemplary embodiment of the present invention.

Referring to FIG. 8, the controller 210 determines whether at least one of the group icons is selected on the display unit 235 at step 810. If at least one of the group icons has been selected on the display unit 235 at step 810, the controller 210 identifies shortcut icons included in the selected group icon at step 820. The controller 210 performs a function corresponding to one of at least two shortcut icons included in the group icon, according to a user's selection.

The controller 210 determines whether a selection is made to magnify a shortcut icon at step 830. If a selection is made to magnify a shortcut icon at step 830, the controller 210 magnifies and displays a corresponding shortcut icon at step 840. For example, if a touch event occurs, once, on the group icon display region on the touch screen 230, the controller 210 magnifies and displays a first shortcut icon of the shortcut icons in the group icon greater than the remaining icons. After that, if the next touch event occurs, the controller 210 magnifies and displays a second shortcut icon greater than the remaining icons. Successively, if the next touch event occurs, the controller 210 magnifies and displays a third shortcut icon greater than the remaining icons, and so on.

Afterwards, the controller 210 determines whether the magnified shortcut icon is selected at step 850. If the magnified shortcut icon is selected at step 850, the controller 210 performs a function corresponding to the selected shortcut icon at step 860. In other words, if a touch event occurs, twice, successively, on the touch screen 230 in a state where the shortcut icon is magnified, the controller 210 performs a function corresponding to the magnified shortcut icon.

On the contrary, if a selection is not made to magnify a shortcut icon at step 830, the controller 210 determines whether a selection is made to ungroup a group icon at step 870. If a selection is made to ungroup a group icon at step 870, the controller 210 displays shortcut icons ungrouped from the group icon on the display unit 235 at step 880. The controller 210 controls the display unit 235 to display the ungrouped shortcut icons on their locations before they were grouped. Determination of whether a selection is made to ungroup a group icon may be performed by the following methods. If the controller ascertains that the user has selected a group icon and detects the change in the operation of the mobile device, it concludes that a selection has been made to ungroup a group icon. Alternatively, if the controller ascertains that the user has selected a group icon and a menu or function key is operated, it can also conclude that a selection has been made to ungroup a group icon. In that case, the controller can show a pop-up message stating whether a selection is made to ungroup the group icon.

As described above, the icon grouping method can group shortcut icons on the display unit 235 in such a way if at least one shortcut icon is moved to a particular region or to a region where another shortcut icon has been displayed. After that, if the user selects one of the grouped shortcut icons in the group icon, it is magnified and displayed greater than the remaining grouped shortcut icons. In addition, the icon grouping method can group shortcut icons on the display unit 235 in such a way that the user can select at least two shortcut icons and then group them by setting a menu or an option. Furthermore, the icon grouping method can group shortcut icons on the display unit 235 in such a way that the user selects a group icon setting menu and then selects part of the shortcut icons, thereby grouping the selected shortcut icons.

As described above, the icon grouping method according to exemplary embodiments of the present invention allow the user to select a number of shortcut icons on the display unit and to rapidly execute a corresponding function based on the selected shortcut icons. In addition, since the icon grouping method can display a number of shortcut icons by group icons, the user can easily select a corresponding one of the grouped shortcut icons.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A method of displaying an icon in a mobile terminal comprising a touch screen, the method comprising:
    displaying a first icon associated to a corresponding function and a second icon associated to a corresponding function on the touch screen;
    receiving a first input that is associated with grouping the first icon and the second icon, the first input corresponding to moving the first icon so as to at least partially overlap the second icon;
    displaying a group icon on the touch screen so as to include smaller sized representations of the first icon and the second icon displayed within the display of the group icon;
    receiving a second input corresponding to a selection of the group icon;
    in response to selection of the group icon with the second input, displaying at least one of an icon that is larger than the smaller sized representation of the first icon and that is associated to a first function relating to the first icon, and an icon that is larger than the smaller sized representation of the second icon and that is associated to a second function relating to the second icon;
    receiving a third input for ungrouping at least one of the first icon or the second icon;
    ungrouping at least one of the first icon or the second icon; and
    displaying one of the first icon or the second icon, separated from the group icon, corresponding to the ungrouped at least one of the first icon or the second icon while the group icon is displayed,
    wherein the second input corresponds to a touch input to the group icon.

2. The method of claim 1, further comprising:
    receiving a third input corresponding to a selection of one of an icon that is larger than the smaller sized representation of the first icon, and an icon that is larger than the smaller sized representation of the second icon; and
    performing a function corresponding to the selected one of the icon that is larger than the smaller sized representation of the first icon, and the icon that is larger than the smaller sized representation of the second icon.

3. The method of claim 1, wherein in response to the first icon being moved so as to be superimposed with at least a portion of the second icon, the group icon is displayed.

4. The method of claim 1, further comprising:
    displaying a graphical user interface on the touch screen, wherein the graphical user interface indicates whether the first icon and the second icon are grouped.

5. The method of claim 1, wherein the smaller sized representations of the first icon and the second icon are concurrently displayed.

6. A method of displaying an icon in a mobile terminal comprising a touch screen, the method comprising:
    displaying a first icon associated to a first function and a second icon associated to a second function on the touch screen;
    receiving a first input that is associated with grouping the first icon with the second icon, the first input corresponding to moving the first icon so as to at least partially overlap the second icon;
    displaying a group icon on the touch screen so as to include representations of the first icon and the second icon displayed within the group icon;
    receiving a second input corresponding to a selection of the group icon;
    in response to selection of the group icon, displaying at least one of an icon that is larger than the reduced representation of the first icon and that is associated to a first function relating to the first icon, and an icon that is larger than the reduced representation of the second icon and that is associated to a second function relating to the second icon;
    receiving a third input for ungrouping at least one of the first icon or the second icon;
    ungrouping at least one of the first icon or the second icon; and
    displaying one of the first icon or the second icon, separated from the group icon, corresponding to the ungrouped at least one of the first icon or the second icon while the group icon is displayed,
    wherein the second input corresponds to a touch input to the group icon.

7. The method of claim 6, further comprising:
    receiving a third input corresponding to a selection of one of the icon that is larger than the reduced representation of the first icon, and the icon that is larger than the reduced representation of the second icon; and
    performing a function corresponding to the selected one of the icon that is larger than the reduced representation of the first icon, and the icon that is larger than the reduced representation of the second icon.

8. A mobile device comprising:
    a touch screen configured to display a plurality of icons including a first icon associated to a corresponding function and a second icon associated to a corresponding function; and
    at least one processor configured to:
        receive a first input that is associated with grouping the first icon and the second icon, the first input corresponding to moving the first icon so as to at least partially overlap the second icon,
        in response to the first input, control the touch screen unit to display a group icon so as to include corresponding smaller sized representations of the first icon and the second icon displayed within the group icon, receive a second input corresponding to selection of the group icon, in response to selection of the group icon with the second input, control the touch screen unit to display at least one of an icon that is larger than the smaller sized representation of the first icon and that is associated to a first function relating to the first icon, and an icon that is larger than the smaller sized representation of the second icon and that is associated to a second function relating to the second icon, receive a third input for ungrouping at least one of the first icon or the second icon, ungroup at least one of the first icon or the second icon, and display one of the first icon or the second icon, separated from the group icon, corresponding to the ungrouped at least one of the first icon or the second icon while the group icon is displayed, wherein the second input corresponds to a touch input to the group icon.

9. The mobile device of claim 8, wherein the at least one processor is further configured to:

operatively receive a third input one of the icon that is larger than the smaller sized representation of the first icon, and the icon that is larger than the smaller sized representation of the second icon, and perform a function corresponding to the selected one of the icon that is larger than the smaller sized representation of the first icon and the icon that is larger than the smaller sized representation of the second icon.

10. The mobile device of claim 8, wherein the at least one processor is further configured to control the touch screen to display the group icon when the first icon is moved so as to be superimposed with at least a portion of the second icon.

11. A mobile device comprising:

a touch screen configured to display a first icon associated to a corresponding function and a second icon associated to a corresponding function; and at least one processor configured to:

receive a first input that is associated with grouping the first icon with the second icon, the first input corresponding to moving the first icon so as to at least partially overlap the second icon, control the touch screen unit to display a group icon so as to include corresponding reduced representations of the first icon and the second icon displayed within the group icon in response to the first input, receive a second input corresponding to selection of the group icon, in response to selection of the group icon with the second input, control the touch screen unit to display at least one of an icon that is larger than the reduced representation of the first icon and that is associated to a first function relating to the first icon, and an icon that is larger than the reduced representation of the second icon and that is associated to a second function relating to the second icon, receive a third input for ungrouping at least one of the first icon or the second icon, ungroup at least one of the first icon or the second icon, and display one of the first icon or the second icon, separated from the group icon, corresponding to the ungrouped at least one of the first icon or the second icon while the group icon is displayed, wherein the second input corresponds to a touch input to the group icon.

12. The mobile device of claim 8, wherein the at least one processor is further configured to control the touch screen to concurrently display the smaller sized representations of the first icon and the second icon.

13. A mobile device comprising:

a touch screen configured to display a first icon associated to a corresponding function and a second icon associated to a corresponding function; and at least one processor configured to:

receive a first input that is associated with grouping the first icon with the second icon, in response to the first input, control the touch screen unit to display a group icon so as to include corresponding reduced representations of the first icon and the second icon displayed within the group icon, receive a second input corresponding to selection of the group icon, the first input corresponding to moving the first icon so as to at least partially overlap the second icon, in response to selection of the group icon with the second input, control the touch screen unit to display at least one of an icon that is larger than the reduced representation of the first icon and that is associated to a first function relating to the first icon, and an icon that is larger than the reduced representation of the second icon and that is associated to a second function relating to the second icon, in response to the second input, receive a third input for ungrouping at least one of the first icon or the second icon, ungroup at least one of the first icon or the second icon, and display one of the first icon or the second icon, separated from the group icon, corresponding to the ungrouped at least one of the first icon or the second icon while the group icon is displayed, wherein the second input corresponds to a touch input to the group icon.

14. The mobile device of claim 13, wherein the at least one processor is further configured to control the touch screen to display the group icon when the first icon is moved so as to be superimposed with at least a portion of the second icon.

15. The mobile device of claim 13, wherein the at least one processor is further configured to:

receive a third input corresponding to a selection of one of the icon that is larger than the reduced representation of the first icon, and the icon that is larger than the reduced representation of the second icon, and in response to the third input, perform a function corresponding to the selected one of the icon that is larger than the reduced representation of the first icon, and the icon that is larger than the reduced representation of the second icon.

16. A non-transitory computer-readable storage medium storing instructions that, when executed, cause at least one processor to perform the method of claim 1.

17. A non-transitory computer-readable storage medium storing instructions that, when executed, cause at least one processor to perform the method of claim 6.

18. The method of claim 6, further comprising:

receiving an input that is associated with setting the mobile terminal to an icon grouping mode; and setting the mobile terminal to the icon grouping mode in response to receiving the input that is associated with setting the mobile terminal to the icon grouping mode.

19. The method of claim 6, further comprising:
receiving a fifth touch input that is associated with adding a third icon associated to a third function to the group icon; and
displaying the group icon on which a corresponding reduced representation of the third icon is located.

20. The method of claim 19, wherein the fifth touch input corresponds to a moving of the third icon to a preset region of the touch screen.

21. The method of claim 19, wherein the fifth touch input corresponds to a moving of the third icon to the group icon.

22. The mobile device of claim 13, wherein the at least one processor is further configured to:
receive an input that is associated with setting the mobile device to an icon grouping mode, and
set the mobile device to the icon grouping mode in response to the input that is associated with setting the mobile device to an icon grouping mode.

23. The mobile device of claim 13, wherein the at least one processor is further configured to:
receive a fifth touch input that is associated with adding a third icon associated to a third function to the group icon, and
control the touch screen unit to display the group icon on which a corresponding reduced representation of the third icon is located.

24. The mobile device of claim 23, wherein the fifth touch input corresponds to a moving of the third icon to a preset region of the touch screen unit.

25. The mobile device of claim 23, wherein the fifth touch input corresponds to a moving of the third icon to the group icon.

* * * * *